(12) United States Patent
Haltmaier

(10) Patent No.: US 6,498,660 B2
(45) Date of Patent: Dec. 24, 2002

(54) SYSTEM AND METHOD FOR THE DYNAMIC THRESHOLDING OF GRAYSCALE IMAGE DATA

(75) Inventor: Richard G. Haltmaier, Amesbury, MA (US)

(73) Assignee: Oak Technology, Inc., Sunnyvale, CA (US)

(*) Notice: Subject to any disclaimer, the term of this patent is extended or adjusted under 35 U.S.C. 154(b) by 8 days.

(21) Appl. No.: 09/785,900

(22) Filed: Feb. 16, 2001

(65) Prior Publication Data
US 2002/0114010 A1 Aug. 22, 2002

(51) Int. Cl.[7] .................. G06K 15/02; H04N 1/405; H04N 1/409; G06T 5/00
(52) U.S. Cl. .................. 358/2.1; 358/3.06; 358/3.22; 358/3.26; 382/199; 382/237; 382/270; 382/275
(58) Field of Search .................. 358/1.9, 456, 457, 358/458, 463, 466, 298; 382/199, 205, 237, 270, 275

(56) References Cited

U.S. PATENT DOCUMENTS 4,638,369 A * 1/1987 Hsieh .................. 382/266
6,337,925 B1 * 1/2002 Cohen et al. .................. 382/199

OTHER PUBLICATIONS

Gonzalez et al, Digital Image Processing, Addison–Wesley Publishing, Mar. 24, 1992, pp. 416–421.*

Baxes, "Digital Image Processing Principles and Applications", John Wiley & Sons, 1994, pp. 35–351.*

* cited by examiner

Primary Examiner—Scott Rogers
(74) Attorney, Agent, or Firm—Lahive & Cockfield, LLP

(57) ABSTRACT

A method for the conversion of grayscale images with a non-white background into halftone images is disclosed. The illustrated embodiment of the present invention addresses the difficulties current conversion methods have in converting multi-bit grayscale images with a non-white background into single bit halftone images. Through manipulation of the grayscale image data, the edges of text and line art features in the grayscale image data are located and extracted from the non-white background through the use of a weight driven conversion algorithm resulting in more defined halftone images.

18 Claims, 5 Drawing Sheets

SYSTEM AND METHOD FOR THE DYNAMIC THRESHOLDING OF GRAYSCALE IMAGE DATA

TECHNICAL FIELD

This invention relates generally to the processing of grayscale image data. More particularly, this invention relates to the conversion of grayscale image data containing text and line art features on a non-white background into a halftone image.

BACKGROUND OF THE INVENTION

Grayscale images use many shades of gray to represent an image. Halftone images, in contrast, typically use black and white dots to form an image. The pattern and density of the black and white dots is varied to represent different shades. Problems arise when converting a grayscale image into a halftone image when the grayscale image background is a non-white color or the foreground color is not black. Current methods of converting grayscale image into halftone image data result in the text and line art features in the grayscale image on a non-white background being obscured when converted into a halftone image. When converting a grayscale image which contains many different shades of gray, the conversion algorithm must determine whether to fill the corresponding position on the halftone image being created with a black dot or a white space. Current algorithms used in the conversion process have difficulty picking out the edge of text and line art features in grayscale images from backgrounds which are not white, resulting in lack of definition of the text and line art features in the new halftone image.

SUMMARY OF THE INVENTION

The present invention addresses problems caused by the current methods of converting grayscale image data into halftone images when the grayscale image data has a non-white background and contains text and line art features. One embodiment of the invention utilizes a conversion algorithm which uses a combination of pixel averages formed from different subsets of pixel values of pixels located within the grayscale image data. The different pixel averages are weighted differently depending on the particular characteristics of the area of the grayscale image data being converted to halftone image data. Pixels are examined one pixel at a time in the grayscale image. The pixel being examined is the focus pixel. Running averages are maintained for both the average pixel value of pixels located in the row of pixels containing the focus pixel and the average pixel value of pixels located in the column pixels containing the focus pixel. Additionally, a pixel window is superimposed over the grayscale image area near the focus pixel, and the average pixel value of the pixels in that pixel window is tracked. The conversion algorithm examines the area near the focus pixel in the grayscale image data for edges indicative of text and line art features and adjusts the weight given to the different averages depending upon whether or not an edge indicating a text or line art feature was found in the grayscale image data. If an edge is detected in the grayscale image, the conversion algorithm gives more weight to the local pixel average. If, on the other hand, the presence of an edge is not detected in the area of the focus pixel, more weight is given in the conversion algorithm to the running horizontal and vertical averages. After assigning the proper weight to the averages, the conversion algorithm produces a threshold value which is compared against the pixel value and used to determine whether that pixel will be depicted as a 1, that is a black dot, or a 0, that is a white space in the halftone image. By shifting the weight given to the various pixel averages depending upon the presence or non-presence of an edge, the conversion algorithm is better able to isolate text and line art features from a non-white background in a grayscale image.

DETAILED DESCRIPTION OF THE INVENTION

The illustrated embodiment of the present invention addresses the problems encountered when converting grayscale images into halftone images. The illustrated embodiment addresses the difficulties encountered in converting grayscale images which contain line art and text features on a non-white background into halftone images. Current conversion methods have difficulties converting the multi-bit grayscale values into single bit halftone values when the background of the image is non-white because the algorithms have difficulties extracting the edges of the text and line art features from the non-white background. The conversion process of the illustrated embodiment tracks continuous horizontal and vertical running pixel value averages which are aggregated into a single average, and also tracks a separate local pixel value average. A weight driven conversion algorithm is used which takes the aggregate average and local pixel average into account, thereby enabling more efficient extraction of text and line art features from the non-white background of a grayscale image.

Figure 1:
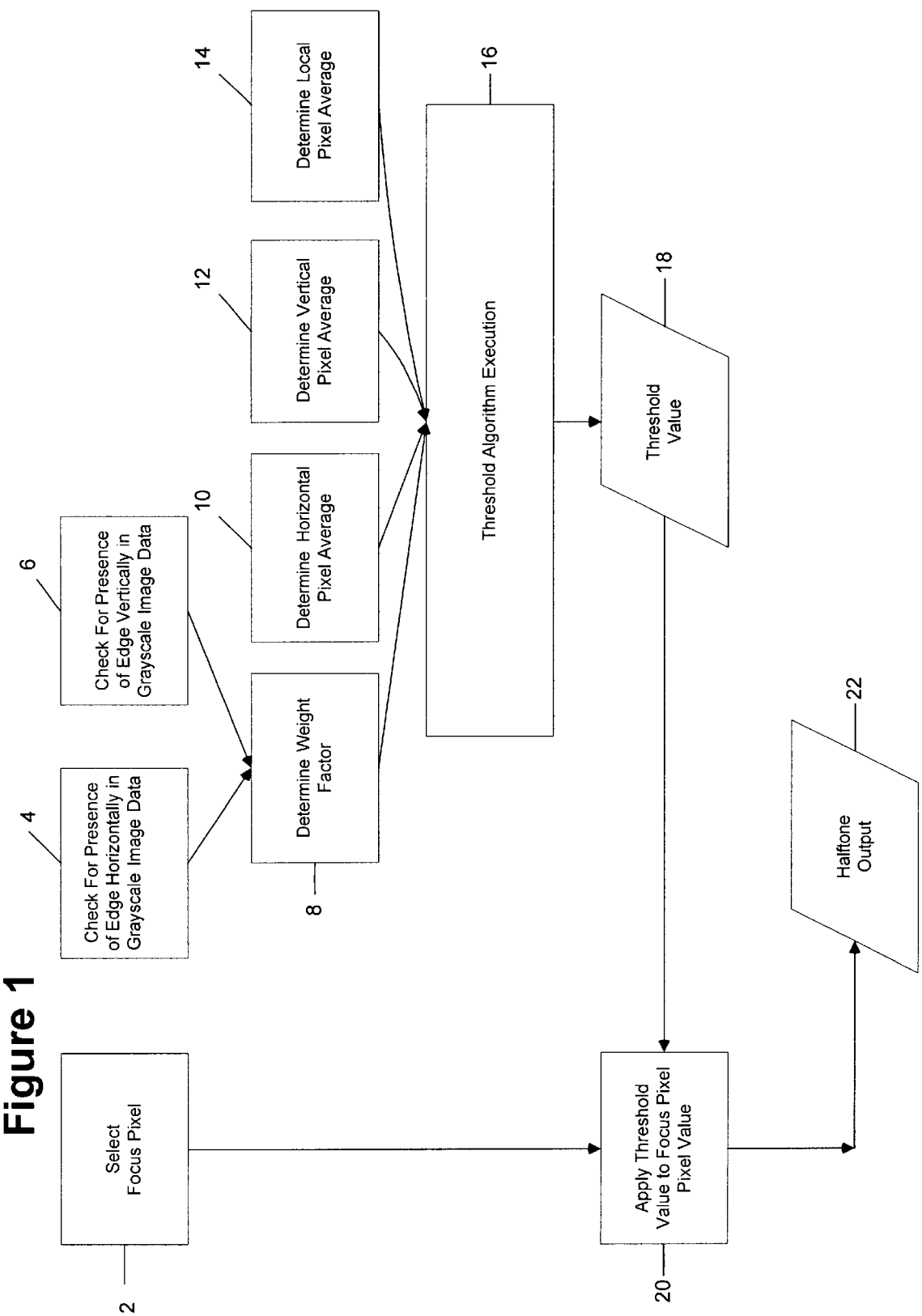
FIG. 1 is a flow chart of the steps taken by an illustrated embodiment of the present invention to produce a halftone pixel value from a grayscale pixel value.

FIG. 1 depicts the steps followed by the conversion algorithm of the illustrated embodiment to convert a multi-bit grayscale pixel value into a single bit halftone pixel value of either 1 or 0. A halftone value of 1 corresponds to a black pixel color, and a halftone value of 0 corresponds to a white pixel color. The conversion algorithm begins by selecting a pixel to examine in the grayscale image data, a focus pixel (step 2). The pixels immediately adjacent to the focus pixel are examined to see if their pixel values indicate the presence of an edge in the grayscale image data horizontally oriented to the focus pixel (step 4). Similarly, the pixels in the grayscale image data immediately adjacent to the focus pixel are examined to see if their pixel values indicate the presence of an edge vertically oriented to the focus pixel (step 6). These examinations utilize horizontal and vertical edge correlator algorithms which are explained more fully below.

The output from the horizontal edge examination (step 4) and the vertical edge examination (step 6) are added together and then divided by a normalizing factor such that the result of the division always yields a result that will be between 0 and 1 (step 8). This result is utilized as a weight factor by the conversion algorithm. The conversion algorithm uses the weight factor to shift the level of emphasis on different pixel averages used by the conversion algorithm.

The conversion algorithm next determines three pixel value averages of subsets of pixels located within the grayscale image data. A horizontal pixel average is determined by averaging the pixel values of pixels located in the grayscale image data on the same horizontal row as the focus pixel (step 10). A vertical pixel value average is determined by averaging the pixel values of pixels located in the grayscale image data in the same vertical column as the focus pixel (step 12). A local pixel average is determined consisting of the average pixel value of the pixels located in a pixel window centered on the focus pixel. In one embodiment of the present invention, such a pixel window is 5 pixels by 5 pixels. The 25 individual pixel values are added together by the conversion algorithm and divided by 25 to arrive at a local pixel average for use by the conversion algorithm.

Once the three pixel averages and the weight factor have been calculated, the conversion algorithm calculates a threshold value which is used to decide whether the focus pixel will be represented as a black or white pixel in the halftone image being created (step 16). The conversion algorithm applies the weight factor (step 8) to the horizontal and vertical pixel averages (step 10 and step 12) and the local pixel average (step 14). The conversion algorithm averages the horizontal and vertical running averages, multiplies them by 1 minus the weight factor (i.e.: a number between 0 and 1) and adds the results to the result of the local average multiplied by the weight factor (a number between 0 and 1). When the weight factor is large, the first multiplier used with the horizontal and vertical running averages will be smaller than the second multiplier used with the local pixel average. When the weight factor is small, the opposite is true. This calculation gives more weight to the local pixel average if an edge is detected in the immediate vicinity of the focus pixel, and more weight to the horizontal and vertical running averages in the event no edge has been detected. The result of the algorithm produces a threshold value (step 18) which is applied to the focus pixel value (step 20) to produce a halftone output (step 22). If the focus pixel value exceeds the threshold value, a halftone output of 1 indicating a black halftone pixel is produced. If the focus pixel value does not exceed the threshold value, a halftone output of 0 is produced, indicating a halftone white pixel is produced. Every pixel in the grayscale image data is analyzed in this manner.

Figure 2:
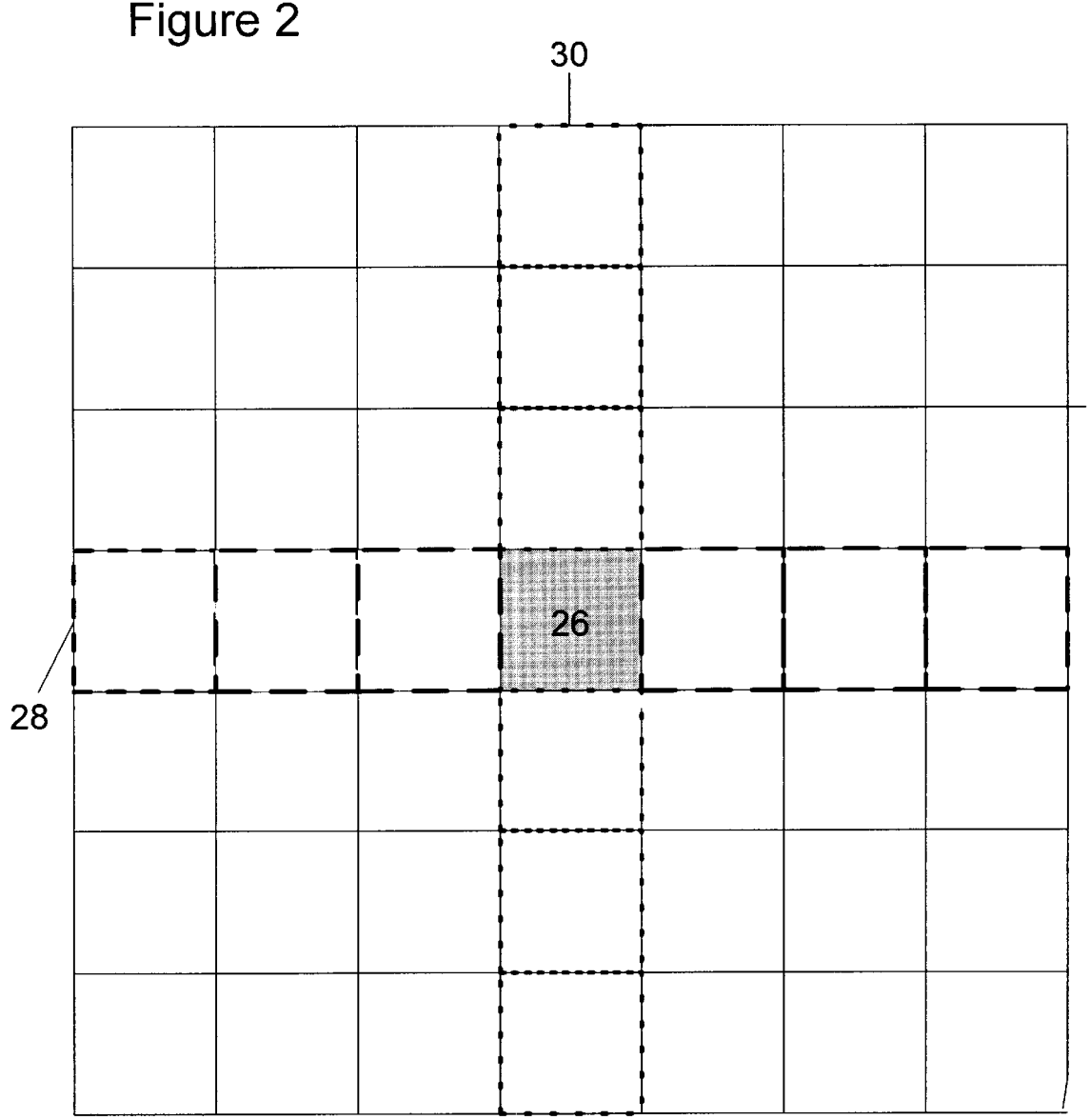
FIG. 2 is a block diagram depicting the calculating of the horizontal and vertical running averages used by the illustrated embodiment.

FIG. 2 depicts a focus pixel 26 located within grayscale image data. The pixels in the same horizontal row 28 as the focus pixel 26 are used to calculate the running pixel value average of the horizontal pixels. Similarly, the pixels in the same vertical column 30 as the focus pixel 26 are used to calculate the pixel value average of the vertical pixels. These averages are given more weight by the conversion algorithm in the illustrated embodiment in the event the examination of the the grayscale image data near the focus pixel does not detect the presence of an edge. If the running horizontal and pixel value averages are given more weight by the conversion algorithm, a lower threshold value is generated compared to the occasions when an edge is detected. The lower the threshold value, the higher the likelihood that the focus pixel value exceeds the threshold value and is to be represented by a black pixel in the halftone image being created.

Figure 3:
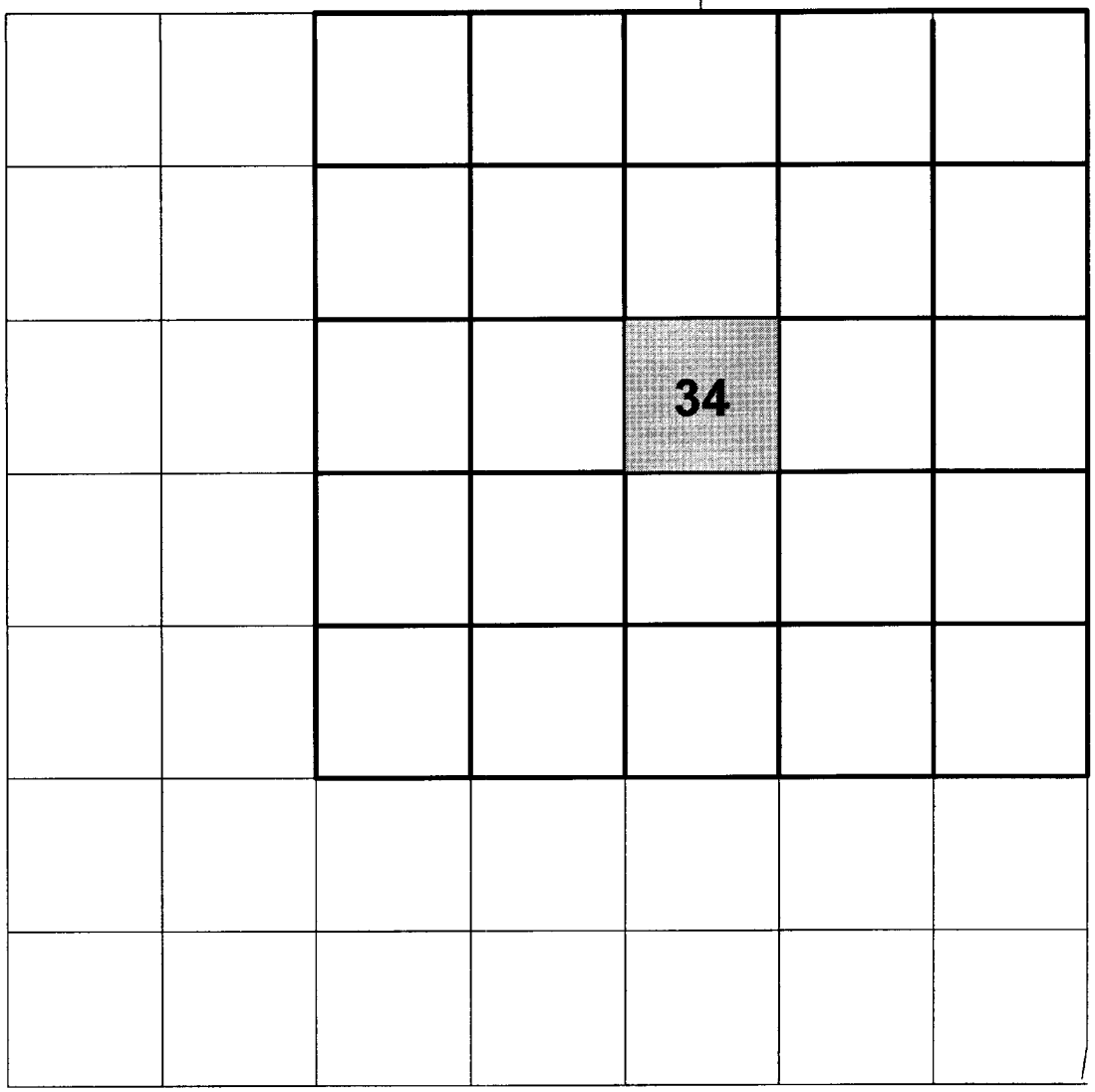
FIG. 3 is a block diagram depicting the calculation of the local pixel average used by the illustrated embodiment.

FIG. 3 depicts a focus pixel 34 located within grayscale image data and a pixel window 36 (indicated by darkened lines in FIG. 3) superimposed on the grayscale image data and centered on the focus pixel 34. Those skilled in the art will realize that while the depicted pixel window 36 is centered on the focus pixel 34, in other embodiments of the present invention the pixel window may overlay the focus pixel in a non-centered orientation. The pixel window 36 is used to calculate a local average of pixel values. The local average for pixel values is given more weight by the conversion algorithm in the event the horizontal and vertical edge correlator algorithms indicate the likely presence of an edge in the grayscale image data adjacent to the focus pixel 34 being examined. The edge correlator algorithms are explained more fully below. By giving more weight to the local pixel value average in the presence of an edge, the conversion algorithm generates a threshold value closer to the value of a focus pixel than would be generated by emphasizing the horizontal and vertical running pixel averages. A larger threshold value forces the focus pixel value to be larger in order to generate a dark halftone output value. The presence of the edge values increases the local pixel value average and the conversion algorithm must adjust accordingly.

Figure 4A:
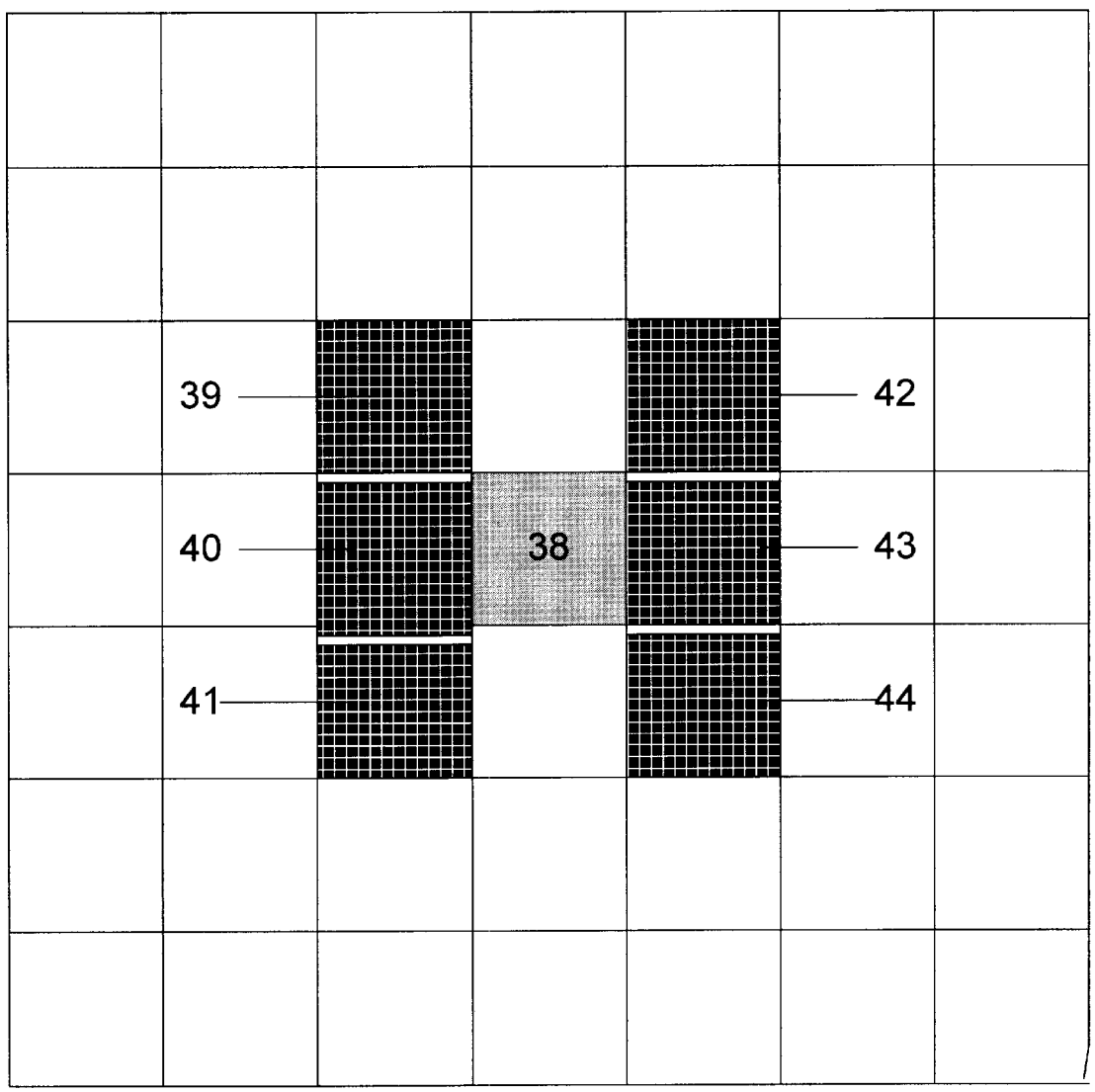
FIG. 4A is a block diagram of the horizontal edge correlator used in the illustrated embodiment of the present invention.

FIG. 4A indicates the horizontal edge correlator used in the illustrated embodiment of the present invention. The pixel values of pixels adjacent to a focus pixel 38 are examined to evaluate the likely presence of an edge in the grayscale image data horizontally oriented to the focus pixel. The pixel values for pixels 39, 40, and 41 are added together and subtracted from the aggregate of the pixel values for pixels 42, 43, and 44. The result is used to inform the conversion algorithm of the presence of an horizontally oriented edge in the grayscale image data near the focus pixel. In general terms, the larger the the result of the horizontal edge correlator, the more likely it is that a horizontally oriented edge is present in the grayscale image data.

Figure 4B:
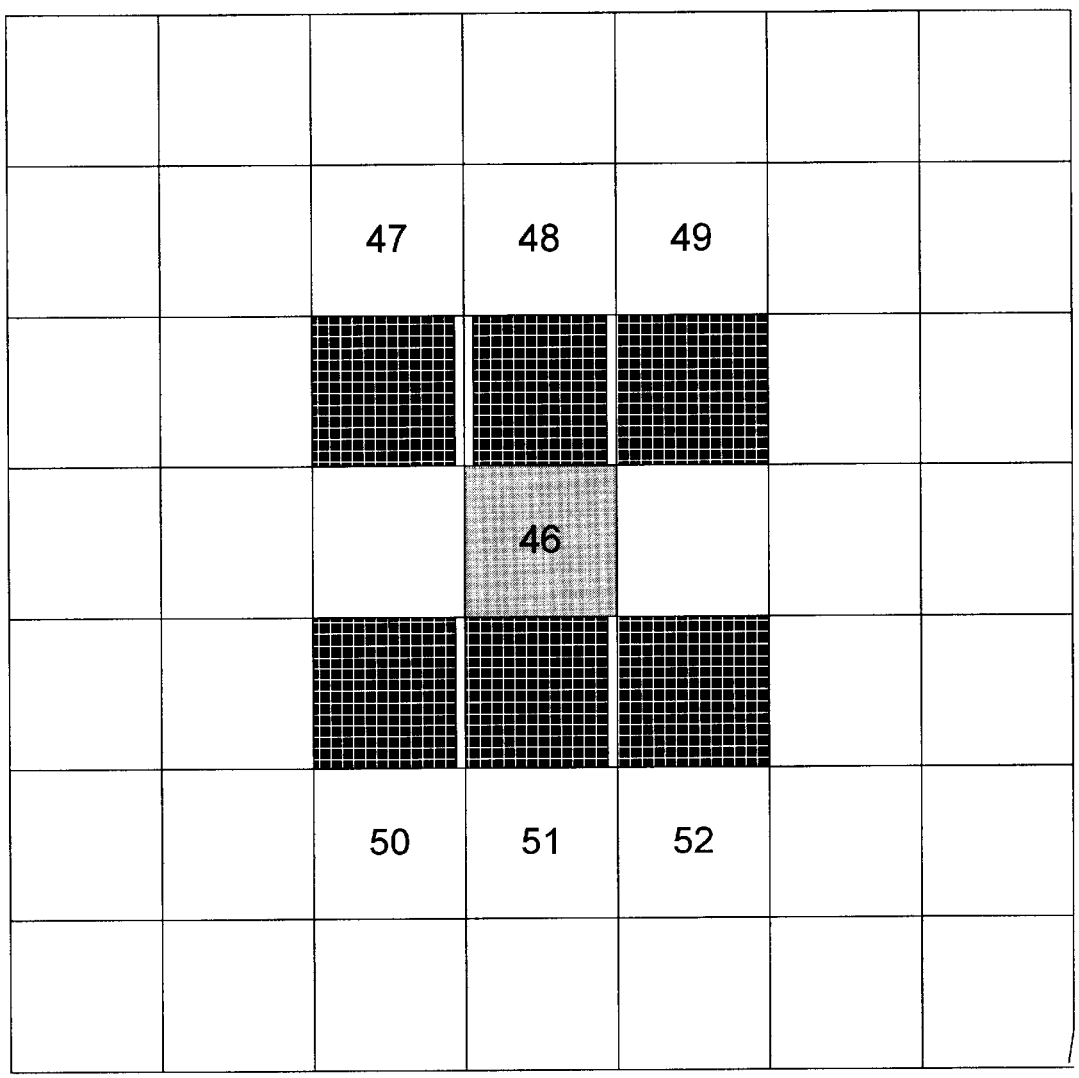
FIG. 4B is a depiction of the vertical edge correlator used by the illustrated embodiment of the present invention.

Similarly, FIG. 4B depicts a vertical edge correlator being applied around a selected focus pixel 46. The pixel values for pixels 50, 51, and 52 are added together to form a first aggregate value, and the pixel values 47, 48, and 49 are added together to form a second aggregate value which is subtracted from the first aggregate value. The result is used to inform the conversion algorithm of a vertically oriented edge in the grayscale image data near the focus pixel. In general terms, the higher the value produced by the computation, the more likely it is that an edge vertically oriented to the focus pixel exists in the grayscale image data.

It will thus be seen that the invention efficiently attains the objectives stated in the previous description. Since certain changes may be made without departing from the scope of the present invention, it is intended that all matter contained in the above description or shown in the accompanying drawings be interpreted as illustrative and not in a literal sense. Practitioners of the art will realize that the sequence of steps in the conversion algorithm may be altered without departing from the scope of the present invention and that the illustrations contained herein are singular examples of a multitude of possible depictions of the present invention.

I claim:

1. A method of processing image data containing pixel values for pixels, said pixels being oriented in said image data in horizontal rows and vertical columns, said method comprising the steps of:

examining a focus pixel in said image data;

performing calculations on pixel values of a subset of pixels in horizontal rows immediately above and below the row of said focus pixel to form a first result, said calculations to detect whether the image region contains an edge;

performing calculations on pixel values of a subset of pixels in vertical columns immediately to the left and to the right of the column of said focus pixel to form a second result, said calculations to detect whether the image region contains an edge;

using a pixel window superimposed on the image data and said focus pixel in order to determine a local pixel average; and calculating a pixel value average for the pixels contained within said pixel window to arrive at said local average.

2. The method of claim 1, wherein the method further comprises the steps of:

determining a weight factor for use in said method, said weight factor being determined by summing said first result and said second result; and dividing said summing result by a pre-established normalization variable so as to form a third result with a value ranging from zero to one.

3. The method of claim 2, wherein the method further comprises the step of:

determining a horizontal pixel average representing the average pixel value for a pixel in the row in which said focus pixel is located.

4. The method of claim 3, wherein the method further comprises the step of:

determining a vertical pixel average representing the average pixel value for a pixel in the column of pixels in which said focus pixel is located.

5. The method of claim 4, wherein the method further comprises the step of:

performing calculations on said vertical pixel average, said horizontal pixel average and said local pixel average, said calculations using said weight to determine a fourth result.

6. The method of claim 5 wherein the method further comprises the step of:

performing a calculation with said fourth result and the pixel value of said focus pixel so as to produce a halftone output of zero.

7. The method of claim 5 wherein the method further comprises the step of:

performing a calculation with said fourth result and the pixel value of said focus pixel so as to produce a halftone output of one.

8. The method of claim 1, said method comprising the additional step of:

examining every pixel in said image data in sequence.

9. The method of claim 8 wherein a halftone value is produced for each pixel in said image data.

10. A medium for use with an electronic device, said medium holding computer-executable instructions for a method, said method comprising the steps of:

examining a focus pixel in image data, said image data containing pixel values for pixels, said pixels being oriented in said image data in horizontal rows and vertical columns;

performing calculations on pixel values of a subset of pixels in vertical columns immediately to the left and to the right of the column of said focus pixel to form a second result, said calculations to detect whether the image region contains an edge;

using a pixel window superimposed on the image data and said focus pixel in order to determine a local pixel average; and summing the pixel values of every pixel in said pixel window and dividing the sum by the number of pixels in said pixel window to arrive at said local average.

11. The medium of claim 10, wherein said method further comprises the steps of:

determining a weight factor for use in said method, said weight factor being determined by summing said first result and said second result; and dividing said summing result by a pre-established normalization variable so as to form a third result with a value ranging from zero to one.

12. The medium of claim 11 wherein said method further comprises the step of:

determining a horizontal pixel average representing the average pixel value for a pixel in the row in which said focus pixel is located.

13. The medium of claim 12 wherein said method further comprises the step of:

determining a vertical pixel average representing the average pixel value for a pixel in the column of pixels in which said focus pixel is located.

14. The medium of claim 13 wherein said method further comprises the step of:

performing calculations on said vertical pixel average, said horizontal pixel average and said local pixel average, said calculations using said weight factor to determine a fourth result.

15. The medium of claim 14 wherein said method further comprises the step of:

performing a calculation with said fourth result and the pixel value of said focus pixel so as to produce a halftone output of zero.

16. The medium of claim 14 wherein said method further comprises the step of:

performing a calculation with said fourth result and the pixel value of said focus pixel so as to produce a halftone output of one.

17. The medium of claim 10, wherein said method comprises the additional step of:

examining every pixel in said image data in sequence.

18. The medium of claim 17 wherein said method produces a halftone value for each pixel in said image data.

* * * * *